March 2, 1937.  W. W. FULLER  2,072,203

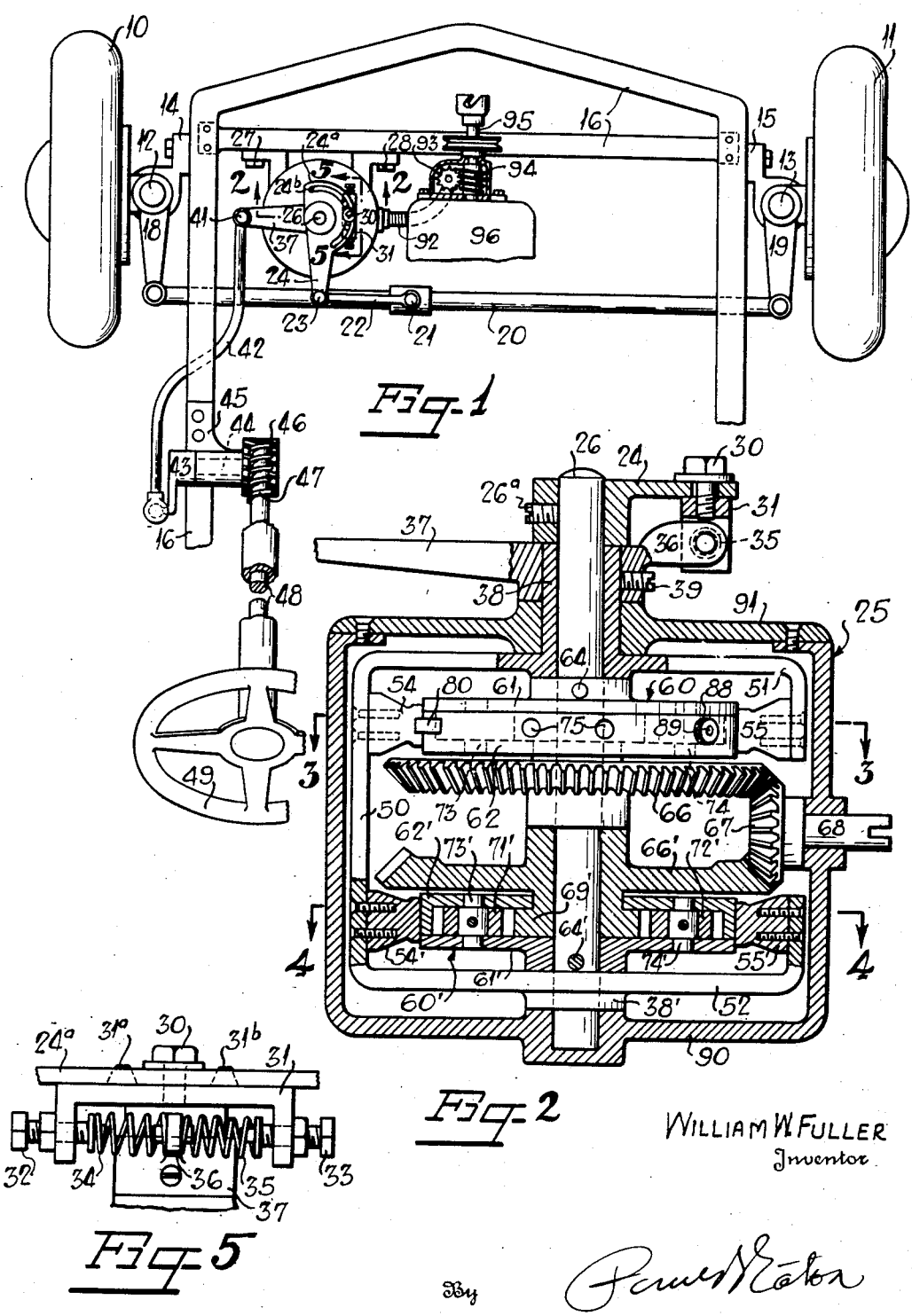

POWER STEERING APPARATUS FOR VEHICLES

Filed June 28, 1935  2 Sheets-Sheet 2

WILLIAM W. FULLER
Inventor

Patented Mar. 2, 1937

2,072,203

UNITED STATES PATENT OFFICE 2,072,203

POWER STEERING APPARATUS FOR VEHICLES

William W. Fuller, Norfolk, Va.

Application June 28, 1935, Serial No. 28,918

2 Claims. (Cl. 180—79.2)

This invention relates to a steering apparatus for automobiles, trucks and the like, and more especially to an apparatus which is adapted to be associated with a steering apparatus of a conventional automobile or truck whereby a slight movement of the steering wheel by the operator will cause a power steering mechanism to be brought into action to assist in the steering of the automobile.

It is a well known fact that when the steering of an automobile has to be accomplished through purely mechanical means that the power required to be applied to the steering wheel in order to produce a certain movement of the front wheels is excessive at times and requires much effort on the part of the driver.

It is, therefore, an object of this invention to provide a power steering mechanism which will assist the driver in steering the automobile, but at the same time will not interfere with the manual operation should the power mechanism be disconnected.

It is a further object of this invention to provide a pair of planetary pumps to the steering mechanism of an automobile, said planetary pumps being normally disconnected from the steering mechanism and being adapted to rotate and constantly pump a suitable fluid such as oil. One of the planetary pumps moves in one direction while the other planetary pump moves in the opposite direction, and upon closing of a valve through which the fluid constantly flows through one of the planetary pumps, the force driving the planetary pump is transferred to the steering column, thereby causing the pilot wheels of the automobile to be rotated in the direction in which the pump forces them.

It is a further object of this invention to provide a pair of planetary pumps in the steering apparatus of an automobile, said planetary pumps moving in opposite directions and being adapted to a pump a continuous flow of oil or other fluids in a circuit under a constant pressure and having means for retarding this flow of oil to cause said pumps or gears to be locked thereby causing the power which normally pumps the oil to be transmitted to the pilot wheels of the automobile to assist the driver in steering the same.

Some of the objects of the invention having been stated, other objects will appear as the description proceeds when taken in connection with the accompanying drawings, in which:—

Figure 1 is a plan view of the front portion of an automobile chassis showing my invention applied thereto;

Figure 2 is a vertical sectional view taken along line 2—2 in Figure 1 showing the upper planetary pump in elevation and the lower planetary pump in section;

Figure 5 is an elevation taken along line 5—5 in Figure 1.

Figure 3:
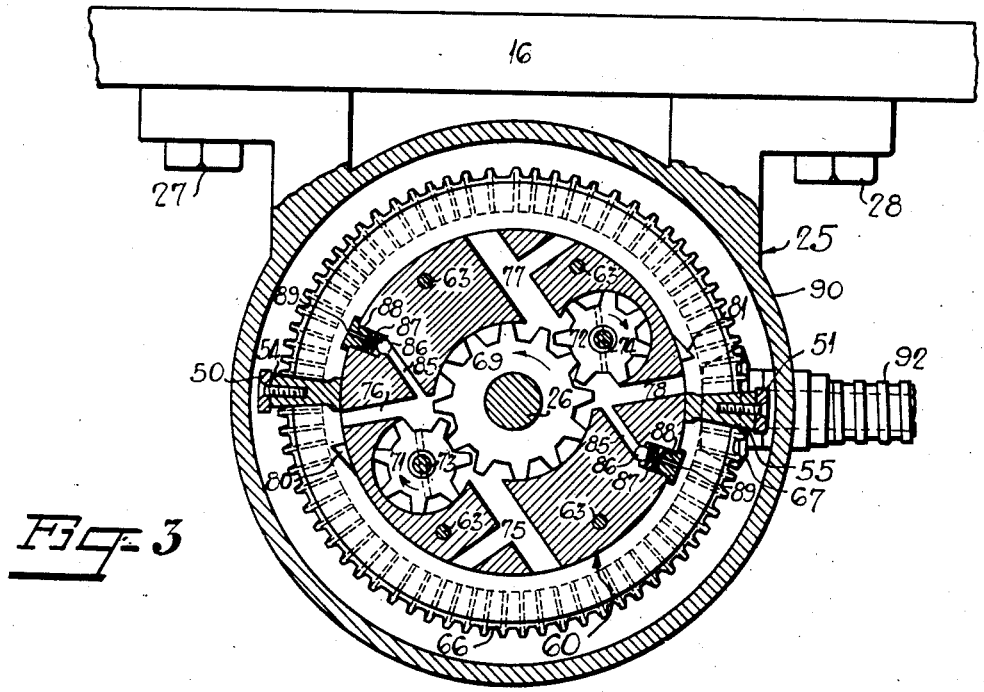
Figure 3 is a sectional plan view taken along line 3—3 in Figure 2.
Figure 4:
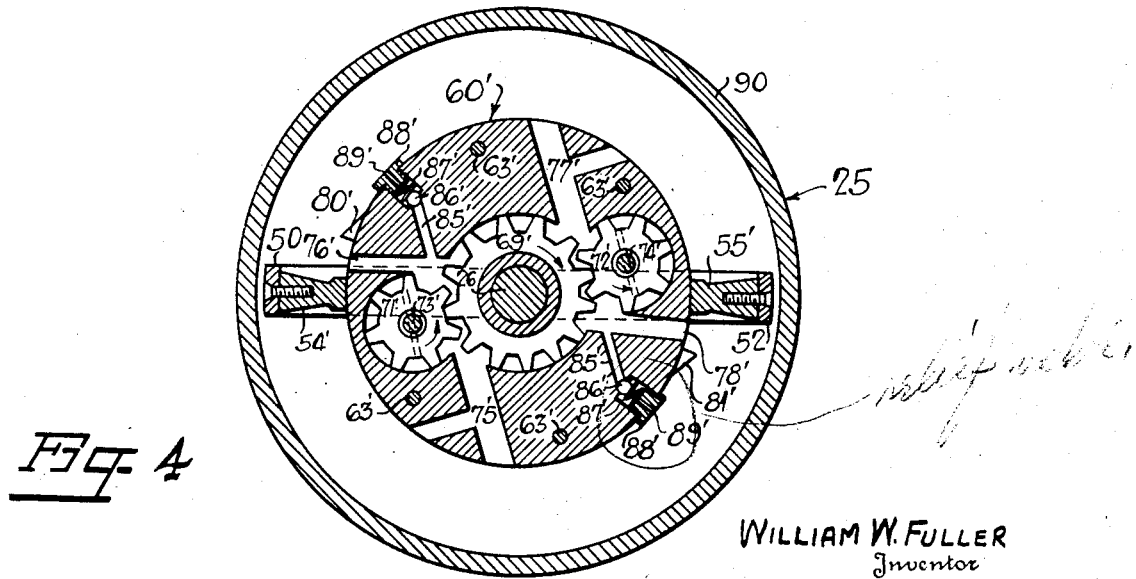
Figure 4 is a sectional plan view taken along line 4—4 in Figure 2.

Referring more particularly to the drawings, the numerals 10 and 11 denote the pilot wheels of an automobile, truck and the like, which are pivoted as at 12 and 13 to brackets 14 and 15, said brackets being secured to chassis frame 16 of the automobile. Connected as at 12 and 13 are arms 18 and 19 respectively, the free end of said arms being joined together by a transverse rod 20. By providing this rod, it is evident that both wheels 10 and 11 will be turned simultaneously when pressure is exerted upon the steering wheel. Rod 20 has pivotally secured thereto as at 21, a link 22, and this link 22 is pivotally secured as at 23 to arm 24.

The arm 24 is fixedly secured to vertically disposed shaft 26 as at 26a, said shaft 26 being rotatably mounted in housing 25 which is secured as at 27 and 28 to chassis 16. Arm 24 has a plate portion 24a integral therewith in which is cut an arcuate slot 24b into which a bolt 30 is adapted to fit. Bolt 30 is threadedly engaged in inverted U-shaped member 31 disposed on the bottom side of portion 24a. The U-shaped member 31 has projections 31a and 31b on the upper side thereof which also project into the slot 24b and assist the bolt 30 in holding the U-shaped member 31 in a fixed position against turning after it has once been set.

Threadably secured in the downwardly extending legs of U-shaped member 31 are screws 32 and 33 which have their ends engaging compression springs 34 and 35 respectively, the other end of said springs being adapted to contact a projection 36 which is integral with arm 37. The arm 37 is fixedly secured to a collar 38 by any suitable means such as set screw 39. The object in providing springs 34 and 35 is to have means for resiliently moving the pilot wheels 10 and 11 in the desired direction without producing any unnecessary shock. The slot 24b will allow the proper adjustment in angularity to be obtained between arms 24 and 37 to suit any desired condition under which my apparatus may have to be installed.

Pivotally secured to the end of arm 37 as at 41 is a link 42 which has on its other end a ball and socket joint which provides a connection between link 42 and downwardly extending arm 43. The upper end of arm 43 is fixedly secured on shaft 44 which is rotatably mounted in bracket 45 secured to the chassis frame 16 of the automobile or truck. The other end of shaft 44 has fixedly secured thereon a gear 46 which engages a worm 47 on the lower end of steering column 48, and on the upper end of steering column 48 is a conventional steering wheel 49 for operating the steering mechanism.

By referring to Figure 2 it is seen that collar 38 has integral therewith arms 50 and 51. The lower end of arm 50 is integral with collar 38' which encircles shaft 26 and is freely mounted thereon. Integral with collar 38' is another arm 52 which is identical to arm 51. The portion 50 has secured thereto valves 54 and 54', whereas, the arms 51 and 52 have secured thereto valves 55 and 55', all of said valves being identical in all respects but the prime notation being added to the lower valves which control a similar pump to the one which will be presently described. The valve 54 normally contacts the periphery of the upper pump which is designated broadly by the reference character 60 and which comprises a cap plate 61 and a lower plate 62, both of said plates being confined to each other by any suitable means such as screws 63. These members 61 and 62 are fixedly secured to shaft 26 by any suitable means such as pin 64. The portion 62 has a cavity cut therein into which a gear 69 is adapted to closely fit, said gear 69 being loosely mounted on vertically disposed shaft 26. This gear is adapted to mesh with smaller gears 71 and 72 mounted on shafts 73 and 74, said shafts being rotatably mounted in members 61 and 62. The gear 69 has integral therewith a beveled gear 66 which meshes with and is driven by a smaller gear 67 fixedly secured on stud shaft 68.

Member 61 has an inlet port 75 through which oil is adapted to be forced as the gear 67 rotates the bevel gear 66 and rotates the gear 69 which, in turn, rotates the gears 71 and 72. It is evident that as these gears rotate oil will be drawn through port 75 and between the teeth on gear 71 which fits tightly into the receptacle or cavity in member 62 and around to the other side of the wheel into outlet port 76. In a like manner oil will be drawn through port 77 around or between the teeth of gear 72 and the side walls of its cavity and into outlet port 78. This action takes place when the ports 76 and 78 are opened which will allow the oil to circulate freely as the gear 66 rotates. When the ports are left open the oil pump is continuously running and no force is being exerted upon the pilot wheels of the automobile and consequently, the wheels remain in the position which they occupied when the ports were previously opened.

Let us assume that the pilot wheels are desired to be given a left-hand turn. When this is desired, of course the steering wheel 48 will be turned to the left in Figure 1, thereby causing the link 42 to move away from the observer. This motion will cause the arm 37 to rotate the collar 38 and the valves 54 and 55 thereon in a counter clockwise manner (Figs. 1, 2 and 3). Of course this action will cause valves 54 and 55 to close the ports 76 and 78 and thereby lock the gear pump which comprises gears 71, 72 and 69. Since the gear 66 is constantly rotating, it is evident that when the gears 71, 72 and 69 are locked that the entire pump 60 will rotate along with the gear 66 thereby imparting counter-clockwise movement to shaft 26 which has the lever 24 fixedly secured thereto. At the same time link 22 and rod 20 will be caused to move to the right in Figure 1, thereby causing the wheels 10 and 11 to turn in a counter-clockwise manner about the pivot points 12 and 13 respectively.

If for any reason the oil pump 60 should not operate properly, and it should be desired to steer the automobile by manual means, I have provided suitable projections 80 and 81 secured on the side of member 62 of the upper pump 60. These projections are engaged by valves 54 and 55 upon left-hand turning of the steering wheel 48. When these members engage the projections 80 and 81 it is evident that counter-clockwise motion will be imparted to the pump 60, the shaft 26, and the lever 24 thereby causing rod 20 to be moved to the right in Figure 1 and causing the pilot wheels 10 and 11 to be rotated to the left.

The lower pump 60' is similar to the upper pump 60, and this pump and its associated parts will be given the same reference characters with the prime notation added. However, there is one minor difference, that is, the location of projections 80' and 81', these projections being disposed on the opposite sides of the ports 76' and 78' from the position of projections 80 and 81 on the upper pump 60. It should be further noted that pump 60' is set at a different angle on the shaft 26 so that when valves 54, 55, 54' and 55' are in normal position none of the ports 76, 78, 76' and 78' are closed. When it is desired that left-hand movement of the pilot wheel be effected, the steering wheel is turned so as to cause the valves 54 and 55 to close the ports 76 and 78, respectively, whereas, the lower ports 76' and 78' will remain open. If it is desired that a right-hand movement of the pilot wheels 10 and 11 be effected, ports 76' and 78' will be closed by the valves 54' and 55' respectively, thereby causing shaft 26 and its associated parts to be rotated in a clockwise manner. Each of the ports 76 and 78 has an outlet safety port 85 into which ball 86 is normally inserted, said ball 86 being normally pushed into the opening of this port by means of a compression spring 87 and a nut 88 threadably secured in the side of member 61. This nut 88 has a port 89 through which the oil is allowed to be expelled in case the port 76 should remain closed so long as to produce an excessive pressure within the oil pump 60.

It should be noted that the housing 25 which is comprised of a lower casing 90 and a covering 91 is entirely filled with oil so that the pumps will be supplied at all times with the same. It should also be noted that while the pinion or bevel gear 67 normally causes the upper gear 66 to rotate in a counter-clockwise manner, that upon closure of the pressure ports 76 and 78, that the gears 71, 72 and 69 will be locked and the entire pump 60 will rotate in a counter-clockwise manner under the force of pinion 67. This, of course, will operate the shaft 26 to cause the pilot wheels 10 and 11 to be turned to the left or in a counter-clockwise manner in Figure 1. The lower gear 66' of course, is adapted to rotate in the opposite direction and upon the closure of the pressure ports 76' and 78', these gears are locked and the entire pump 60' is caused to rotate with the bevel gear 66' in a clockwise manner, which, in turn, will rotate the shaft 26 in a like manner to cause the pilot wheels 10 and 11 to be turned in an opposite direction from that just described.

Connected to the end of shaft 68 is a flexible drive shaft 92 which has secured on the other end thereof a pinion 93, said pinion 93 being adapted to engage a worm 94 fixed on the crank shaft 95 of motor 96. While it is evident that any suitable means for continuously driving this planetary system of pumps for steering an automobile may be provided, this method of connecting the pump directly to the main drive shaft of the motor provides an efficient means which eliminates unnecessary parts, such as batteries and electric motors. It has the further advantage of being easily installed and directly synchronized with the speed of the motor, that is, the faster the motor is rotating the more power is delivered to the steering menchanism.

It is evident that when the steering wheel is given enough rotation to block one set of ports 76 and 78 or 76' and 78' if the steering wheel is stopped in its rotation the power steering will immediately move and unblock these parts. Therefore, by continuing to rotate the steering wheel the parts will remain closed so long as the follow-up continues, and power steering will cease shortly after movement of the steering wheel has ceased.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Steering apparatus for motor vehicles having pilot wheels and manual steering means comprising a casing, a shaft rotatably mounted in the casing, a pair of pump housings fixedly mounted on said shaft, a planetary gear pump mounted in each housing, means for driving both planetary gear pumps in opposite directions, said casing being adapted to be filled with a suitable fluid for the pumps, inlet and outlet ports for the pumps normally held in open position, and means controlled by movement of the manual steering means in one direction for closing the outlet port for one of the two pumps to cause rotation of the shaft and movement of the steering apparatus in one direction, and means controlled by the movement of the manual steering means in a reverse direction for closing the outlet to the other of said pumps to cause rotation of the shaft in a reverse direction.

2. In a motor vehicle having a motor, pilot wheels and manual steering means, apparatus disposed in the manual steering means for utilizing the power of the motor for assisting the operator, which comprises a casing secured to the chassis of the vehicle, a shaft rotatably mounted in said casing, a pair of pump housings rotatably mounted on said shaft, a gear pump in each housing, means driven by the motor for continuously driving said pumps in opposed directions, each of said housings having an intake port and an outlet port for the pump associated therewith, a pair of valves rotatably mounted on said shaft and connected to the manual steering means for closing the discharge port of one of the pump housings when the manual steering means is turned in one direction to cause the pump housing to rotate to move the pilot wheel in said one direction and for closing the outlet port in the other pump housing when the manual steering means is moved in the other direction to close the discharge port in the other housing and rotate the other pump housing to move the pilot wheel in the other direction.

WILLIAM W. FULLER.